Figure 1:
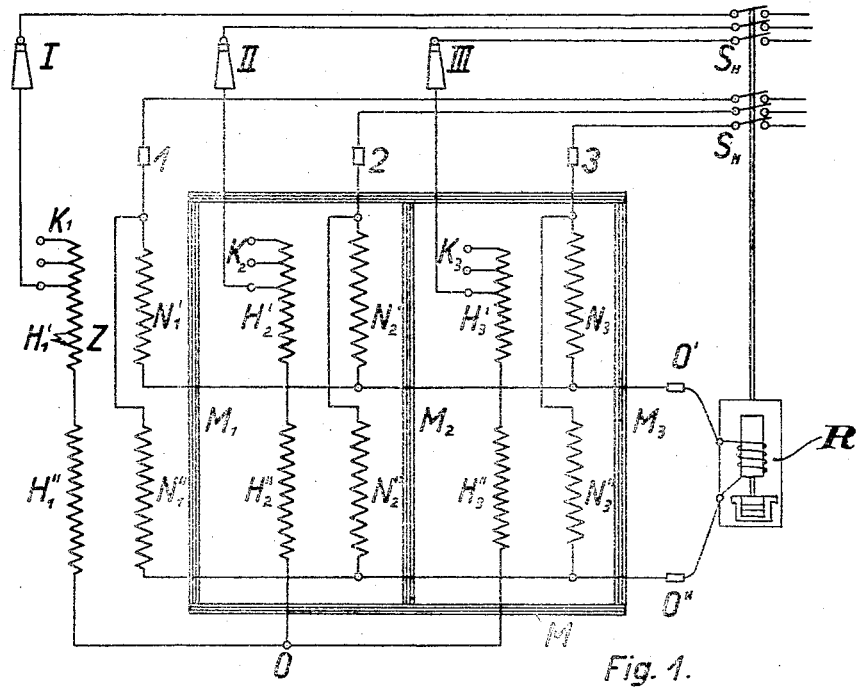

Feb. 25, 1930.  J. JONAS  1,748,451

DEVICE FOR THE SELECTIVE PROTECTION OF HIGH TENSION TRANSFORMERS

Filed Aug. 31, 1927

J. Jonas
INVENTOR

By: Marks & Clark
Attys.

Patented Feb. 25, 1930

1,748,451

UNITED STATES PATENT OFFICE

JULIUS JONAS, OF BADEN, SWITZERLAND, ASSIGNOR TO AKTIENGESELLSCHAFT BROWN, BOVERI & CIE., OF BADEN, SWITZERLAND

DEVICE FOR THE SELECTIVE PROTECTION OF HIGH-TENSION TRANSFORMERS

Application filed August 31, 1927, Serial No. 216,728, and in Germany September 8, 1926.

Devices for the selective protection of high tension transformers are known, which become operative on a fault occurring in the transformer, which however have certain drawbacks which render them unsuitable for general use. Thus, in the well-known protective means working on the differential principle for transformers the difference between the energy flowing into the transformer and the energy withdrawn from the transformer is measured by comparing the primary input current with the secondary output current by means of current transformers connected up in the primary and secondary circuits. Apart from the natural losses in the transformer, these currents must be equal, when taken with respect to the same number of windings on the primary and secondary side. Should a fault occur in the transformer, however, which creates a local circuit in the transformer, the comparison referred to will show a differential current which can be utilized for operating a protective device. This so-called differential protection, however, has the drawback, that it necessitates the provision of a number of current transformers, many connecting wires and the like, and that these additional pieces of apparatus detract from the simplicity of the connections and the plant and hamper inspection.

Another protective system makes use of the changes which take place in the oil box of the transformer under the influence of the fault in the transformer, gas bubbles being formed in the oil due to local heating, by which the oil is displaced and is subjected to shocks, in which case all the attendant phenomena may be made use of for operating a contact device for disconnecting the transformer from the network. However, the arrangements which react to mechanical changes in the condition of the oil also have great disadvantages when applied in practice, so that in many cases they are not used. In the first place, protective means of this kind entail a closed construction of the transformer oil box, the joints of which must be well packed, and a separate expansion vessel for the oil. Such a construction, however, considerably increases the cost of the transformer. In addition to this, there are further disadvantages with respect to the working of the transformer. When the transformer is disconnected by the effect of the bubbles formed, the arrangement will not act sufficiently rapidly in the case of a serious fault. On the other hand gas bubbles may be evolved by accidental causes, for instance by innocuous static discharges between parts of the transformer or through the disassociation of residual air in the oil, so that the arrangement frequently becomes operative unnecessarily and without sufficient cause necessitates the careful examination of the transformer and the cutting-off of the current supply. Such interruptions in the current supply, however, render the economic value of the protective device quite illusory. If, on the other hand, the pressure impulses occurring in the oil vessel, in the case of faults, be made use of for operating the protective device, the transformer will be disconnected rapidly, on a fault occurring, this will also take place, when a short circuit in the network is closed over the transformer, in other words, when there is no fault in the transformer, so that in this case as well there will be unnecessary interruptions in the current supply. This known arrangement, therefore, by no means fulfils the requirements of practical working, as it works partly too slowly and partly not sufficiently selectively as regards the cause of the disturbance.

In contradistinction to the two solutions of the problem just referred to for selectively protecting a high tension transformer, according to the present invention the effects of the fault on additional apparatus outside the transformer itself are not made use of, for instance the difference in the flow through current transformers or variations in the state of the cooling medium (oil), but the transformer itself is to be so constructed that every disturbance of the symmetry, (either that of the field or of the current) such as is always caused, in the case of a fault occurring, produces in a separate circuit a current indicating the fault or causing the disconnection of the transformer. This is effected by a peculiar construction and arrangement of a winding system of the transformer. In most cases, faults occur in the high tension winding and it would therefore appear to be of advantage to connect the protective device in the high tension winding itself, it may however be found preferable for various reasons to connect the protective device up in the low tension winding system. Owing to the inductive interlinking in the case of transformers, the low tension winding, if suitably arranged, will also indicate disturbances in the symmetry occurring at the high tension winding, and this circumstance makes it possible to use the low tension winding in solving the above problem.

The invention thus has for its object to provide an arrangement for the selective protection of high tension transformers, on a fault occurring in the transformer, which consists in this, that a winding system of the transformer consists of two parallel connected windings having separate star and neutral points, which windings are wound next to one another on the common magnet cores in such a manner that each of them is well interlinked with a portion of the other winding system coordinated to it by the position on the magnet core and that between the two led out star points of the former winding system an apparatus is connected up, which, on current flowing through it, acts as a protective device or operates such a device and may automatically disconnect the transformer from the network. Preferably the two parallel connected parts of the former winding system will be arranged next to one another and separated from one another on the common magnet core, such that they are only loosely coupled together. This loose coupling is of essential importance for the functioning of the device, as a reaction of the two parallel windings on one another might equalize the asymmetry in the distribution of voltage occurring in them, in the case of a fault, in such a manner that the protective device will not function.

Figure 2:
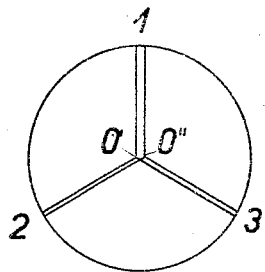
Figure 2:
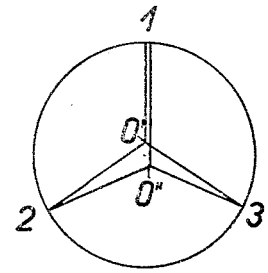

In the accompanying drawing, Fig. 1 shows a constructional example of the invention, and Fig. 2 a voltage diagram. In Fig. 1 the protective device is shown as being connected to the low tension winding and in this figure M is the magnet frame of a three-phase transformer, $M_1$, $M_2$, $M_3$ the three limbs of the magnet frame, $N_1'$, $N_2'$, $N_3'$ and $N_1''$, $N_2''$, $N_3''$ the windings of the three phases of two low tension windings each connected in star, the said windings being connected in parallel with the low tension terminals 1, 2 and 3.

$O'$ and $O''$ are the separate led out star points of the two low tension windings. R is a disconnecting relay connected up between the terminals $O'$ and $O''$, which actuates the switches $S_H$ and $S_N$ by which the transformer can be connected and disconnected both on the high tension and low tension side. The high tension winding connected to the high tension terminals I, II and III consists of the parts $H_1'$ and $H_1''$, $H_2'$, $H_2''$, $H_3'$, $H_3''$, the indices 1, 2 and 3 indicating the phases to which the parts belong. Thus, parts of the high tension winding belonging to the same phase are in the present instance connected in series while the phases among themselves are connected in star in the point O. The parts $H_1'$, $H_2'$, $H_3'$ have on one side windings capable of being disconnected, the corresponding winding switches being marked $K_1$, $K_2$, $K_3$. As will be seen from the figure, the windings $N_1'$ and $N_1''$ are wound separately from one another, each of them occupying the space of one half a limb. Directly opposite each winding $N_1'$ is a high tension winding part $H_1'$ and opposite each winding $N_1''$ a high tension winding part $H_1''$. As, (apart from the magnetizing current), the primary and secondary ampere windings balance one another, the current in the windings $N_1'$ and $N_1''$ is determined by the current in the windings $H_1'$ and $H_1''$. For $H_1'=H_1''$ and $N_1'=N_1''$ the current $N_1'$ equals the current $N_1''$. This quantity of current need not however exist even in normal working conditions. If by means of the contact devices $K_1$, $K_2$, $K_3$ the same number of turns be disconnected from each of the three winding parts $H_1'$, $H_2'$ $H_3'$ the remaining winding parts of $H_1'$, $H_2'$ $H_3'$ will have less turns than the winding parts $H_1''$, $H_2''$ $H_3''$ and the winding $N_1''$ will carry correspondingly more current than the winding $N_1'$. This circumstance, however, will not cause any asymmetric distribution of the voltage to the single phases of the windings $N_1'$ and $N_1''$ so that for this reason no current will flow between the star point terminals $O'$ and $O''$.

The diagram of the voltages between the terminals 1 $O'$, 2 $O'$, 3 $O'$, 1 $O''$, 2 $O''$, 3 $O''$ is represented by the vector diagram of Fig. 2ª. It will be seen that between the points $O'$ and $O''$ there is no voltage, as long as each of the two low voltage windings is loaded symmetrically. There would also be such a symmetrical loading should there be a short circuit of the network over the transformer. In this case as well, there will be no voltage between the points $O'$ and $O''$. The case is different, however, should a faulty place develop in the transformer. Assuming, for instance, that a turn Z of the winding $H_1'$ become short circuited, this will cause a considerable disturbance of the voltage symmetry of the three phases, more particularly of the winding $N_1'$, for the short circuit in the turn will produce a strong stray field which will produce a drop in voltage in the winding $H_1'$ and in the winding $N_1'$ which is well interlinked with the same. The diagram of the voltages 1, 2, 3, $O'$ of Fig. 2ª will change into the diagram 1, 2, 3, O' of Fig. 2ᵇ, in which the vector 1 O' is shortened while the vectors 2 O' and 3 O' are lengthened. If the high tension be given by the voltage in the network, the short circuit in the turn of winding $H_1'$ will produce a change in the distribution of voltage in the windings $H_1'$ and $H_1''$, such that the voltage in the winding $H_1''$ will slightly increase, when it drops in $H_1'$ (the sum of the two voltages is constant, namely equal to the given network voltage) so that the voltage diagram 1, 2, 3, O'' in Fig. 2ᵃ will also experience a certain change, but in the opposite sense. In Fig. 2ᵇ the vector 1 O'' is lengthened, while the vectors 2 O'', 3 O'' are correspondingly shortened. Thus, between the two star points O' and O'' there will be the difference in voltage O', O'' as shown in Fig. 2ᵇ, which will produce in the cut-off relay R a current, by which the relay will be operated. Should the high tension winding have no voltage regulating turns, the windings $H_1'$ and $H_1''$, which are similar to one another, might also be connected in parallel. Their use in the protective arrangement would necessitate their star points being brought outside. Owing to the relatively greater voltages the relay R would have to be connected to the corresponding star points over an intermediate transformer. In this case, in which the low tension winding lies between the high tension winding and iron, a faulty place in the iron of the transformer would not make itself so noticeable in the protective device on the high tension side, as in certain circumstances the low tension winding weakens the inductive effect of the current due to the fault on the high tension winding by screening action. For these reasons it is in this case preferable to connect the protective device to the low tension winding. But even in this case it may be advisable in certain circumstances to feed the relay over a transformer, should it be desirable, for instance, to earth the neutral point of the low tension winding (for instance over an extinguishing coil). In this case the middle point of the primary winding of the intermediate transformer may be used as the tapping point for the earth conductor. Similarly, however, the neutral point of the high tension winding may also be earthed. Should, however, the high tension winding, as shown in Fig. 1, have only a simple star connection, it will be sufficient to lead out the star point for connecting the earth conductor. It is of course possible, instead of using two windings connected in parallel for the protective arrangement, to use a plurality of such windings and to group them in a suitable manner, in every case, however, the arrangement so produced represents a "symmetry meter" of the transformer, which cuts off the transformer immediately or, if desired, with a time lag, should a fault occur in the latter. Suitable retarding devices may be provided in a known manner in the cut-out device. The duration of the lag may be made dependent on the fault, such that the time taken for cutting off will be the shorter, the greater the asymmetry in the voltage between the star points (O' and O''). By this means, it is possible to prevent the transformer being cut out immediately, on the occurrence of negligible faults. In this case it is advisable to connect up an optical or acoustic signalling device. When a reserve transformer is provided, the disconnecting device might be so arranged that, on the faulty transformer being cut out, the sound transformer (reserve transformer) will be connected up, so that an overload in any part of the installation will be prevented.

The arrangement described has this advantage over the protective devices referred to at the beginning, that it requires no additional auxiliary transformers or current transformers and that it cuts out only the faulty transformer in a selective manner with respect to the cause of the fault, with any desired time lag, which may be dependent on the magnitude of the fault.

What I claim is:

1. A device for the selective protection of a high tension transformer having a high tension and a low tension winding, on a fault occurring within the transformer, characterized by the feature that one winding of the transformer consists of two parallel connected parts provided with separate star and neutral points, the two parts being wound next to one another on a common magnet core so that both parts are well interlinked with the other winding which is co-ordinated to it by its position on the magnet core, and that between the two led out neutral points of the two said parts of the first winding a device is connected, which, on a current passing through it, acts as a protective device and is capable of causing the transformer to be disconnected automatically from the network.

2. A device as claimed in claim 1, characterized by the feature that the low tension winding of the transformer is employed as the winding used for the protective arrangement.

3. A device as claimed in claim 1, characterized by the feature that the two parallel connected parts of the winding used for the protective arrangement are wound next to one another on the common magnet core but distanced apart, so that the said parts are only loosely coupled together in an inductive manner.

4. A device as claimed in claim 1, characterized by the feature that the device connected between the star points of the two parallel windings operates with a time lag.

5. A device as claimed in claim 1, wherein the device connected between the star points of the two parallel windings operates with a time lag, the magnitude of the time lag being made inversely proportional to the asymmetric voltage between the said star points of the divided winding.

In testimony whereof I have signed my name to this specification.

JULIUS JONAS.